US006598714B1

United States Patent
Rinsma et al.

(10) Patent No.: US 6,598,714 B1
(45) Date of Patent: Jul. 29, 2003

(54) ACTUATOR COMPRISING FLEXIBLE ELEMENT, AND BRAKE CALLIPER COMPRISING SUCH ACTUATOR

(75) Inventors: Andries Christian Rinsma, Leeuwarden (NL); Jacobus Zwarts, Nieuwegein (NL)

(73) Assignee: SFK Engineering and Research Centre B.V., Nieuwegein (NL)

( * ) Notice: Subject to any disclaimer, the term of this patent is extended or adjusted under 35 U.S.C. 154(b) by 0 days.

(21) Appl. No.: 09/600,553

(22) PCT Filed: Sep. 30, 1998

(86) PCT No.: PCT/NL98/00566

§ 371 (c)(1),
(2), (4) Date: Sep. 7, 2000

(87) PCT Pub. No.: WO99/37939

PCT Pub. Date: Jul. 29, 1999

(51) Int. Cl.$^7$ ................................. F16D 55/02
(52) U.S. Cl. .................. 188/71.9; 188/72.4; 188/196 C
(58) Field of Search ............... 188/71.1, 71.8, 188/71.9, 72.4, 73.36, 73.38, 202, 203, 196 A, 196 C, 218 XL; 192/109 F

(56) References Cited

U.S. PATENT DOCUMENTS

| | | | | |
|---|---|---|---|---|
| 3,633,715 A | * | 1/1972 | Burnett | 188/170 |
| 3,866,721 A | | 2/1975 | Pringle | |
| 3,974,897 A | * | 8/1976 | Pringle | 188/196 A |
| 4,031,986 A | * | 6/1977 | Thompson | 188/72.4 |
| 4,042,072 A | * | 8/1977 | Baba | 188/71.8 |
| 4,355,708 A | * | 10/1982 | Papagni | 188/196 D |
| 4,546,295 A | | 10/1985 | Wickham et al. | |
| 4,553,644 A | * | 11/1985 | Folch | 188/72.4 |
| 4,605,104 A | * | 8/1986 | Thompson | 188/72.4 |
| 4,809,824 A | * | 3/1989 | Fargier et al. | 188/72.8 |
| 5,014,827 A | | 5/1991 | Wang et al. | |
| 5,651,430 A | * | 7/1997 | Rancourt et al. | 188/1.11 L |
| 6,311,807 B1 | * | 11/2001 | Rinsma | 188/71.9 |

FOREIGN PATENT DOCUMENTS

| | | |
|---|---|---|
| DE | 1 431 129 | 7/1970 |
| DE | 32 02 275 | 7/1986 |
| DE | 39 35 425 | 4/1991 |
| DE | 196 07 759 | 5/1997 |
| DE | 196 52 230 | 6/1998 |
| EP | 0 173 658 | 3/1986 |
| EP | 0 263 752 | 4/1988 |
| EP | 0 285 773 | 10/1988 |
| EP | 0 632 181 | 1/1995 |
| FR | 2 449 015 | 9/1980 |
| GB | 2 078 983 | 1/1982 |
| GB | 2307525 A * | 5/1997 |
| NO | WO 99/37010 * | 7/1999 |
| WO | 96/03301 | 2/1996 |
| WO | 97/17553 | 5/1997 |
| WO | 97/30294 | 8/1997 |

\* cited by examiner

*Primary Examiner*—Christopher P. Schwartz
*Assistant Examiner*—Xuan Lan Nguyen
(74) *Attorney, Agent, or Firm*—Oliff & Berridge, PLC

(57) ABSTRACT

Apparatus for providing a linear movement to an actuating member while preventing axial loadings from being transmitted from the actuating member to an engaging member, such as a screw. A pressure pad or springs are interposed between an actuating member and an engaging member such that axial loadings are prevented from being transmitted from the actuating member to the engaging member due to the resilient effect of the springs or pressure pad.

16 Claims, 3 Drawing Sheets

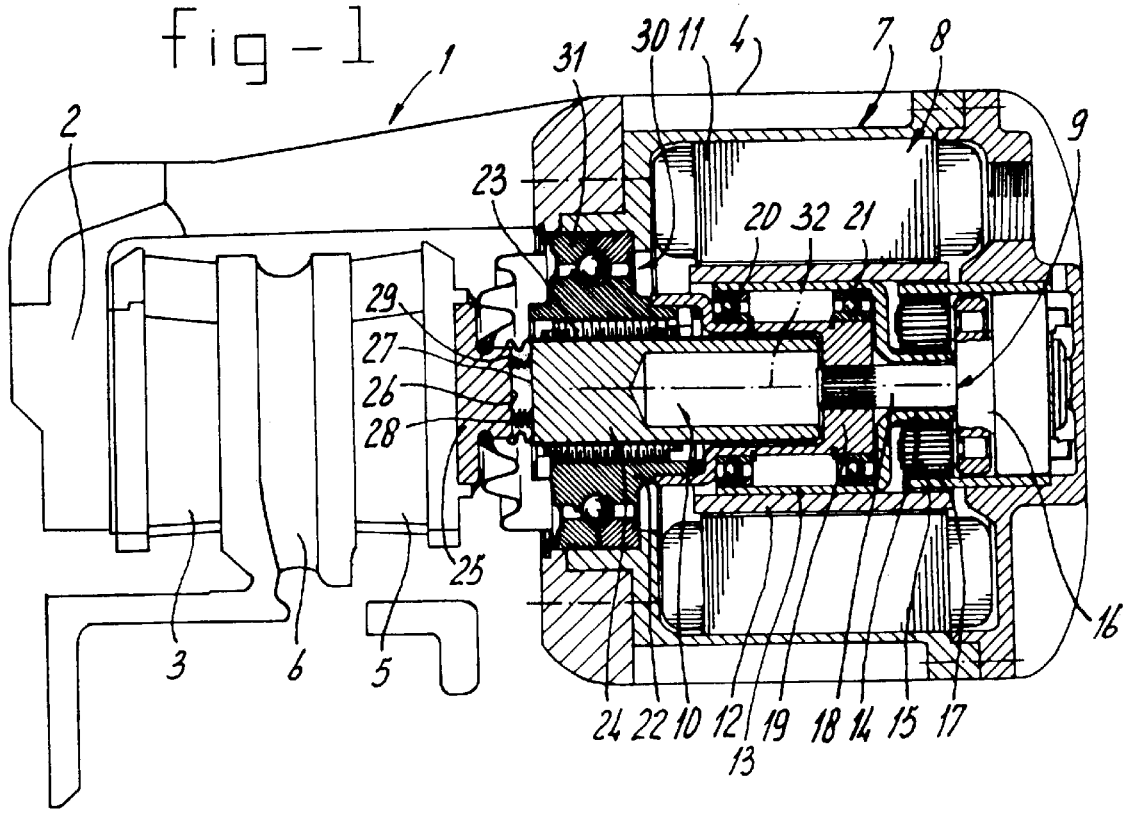
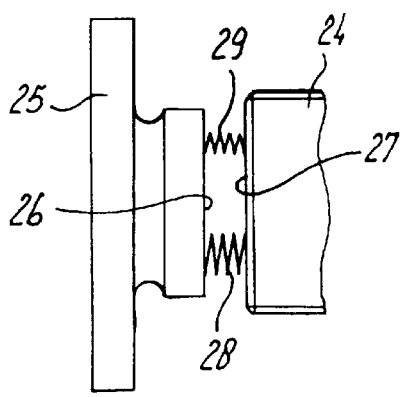
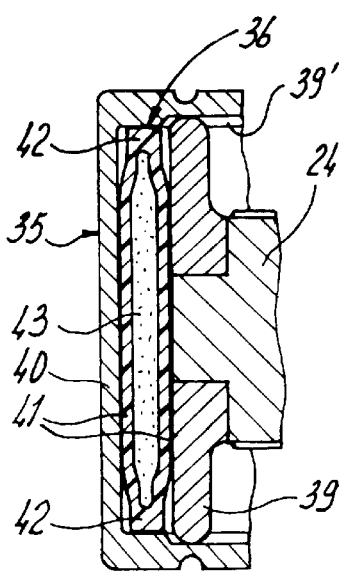

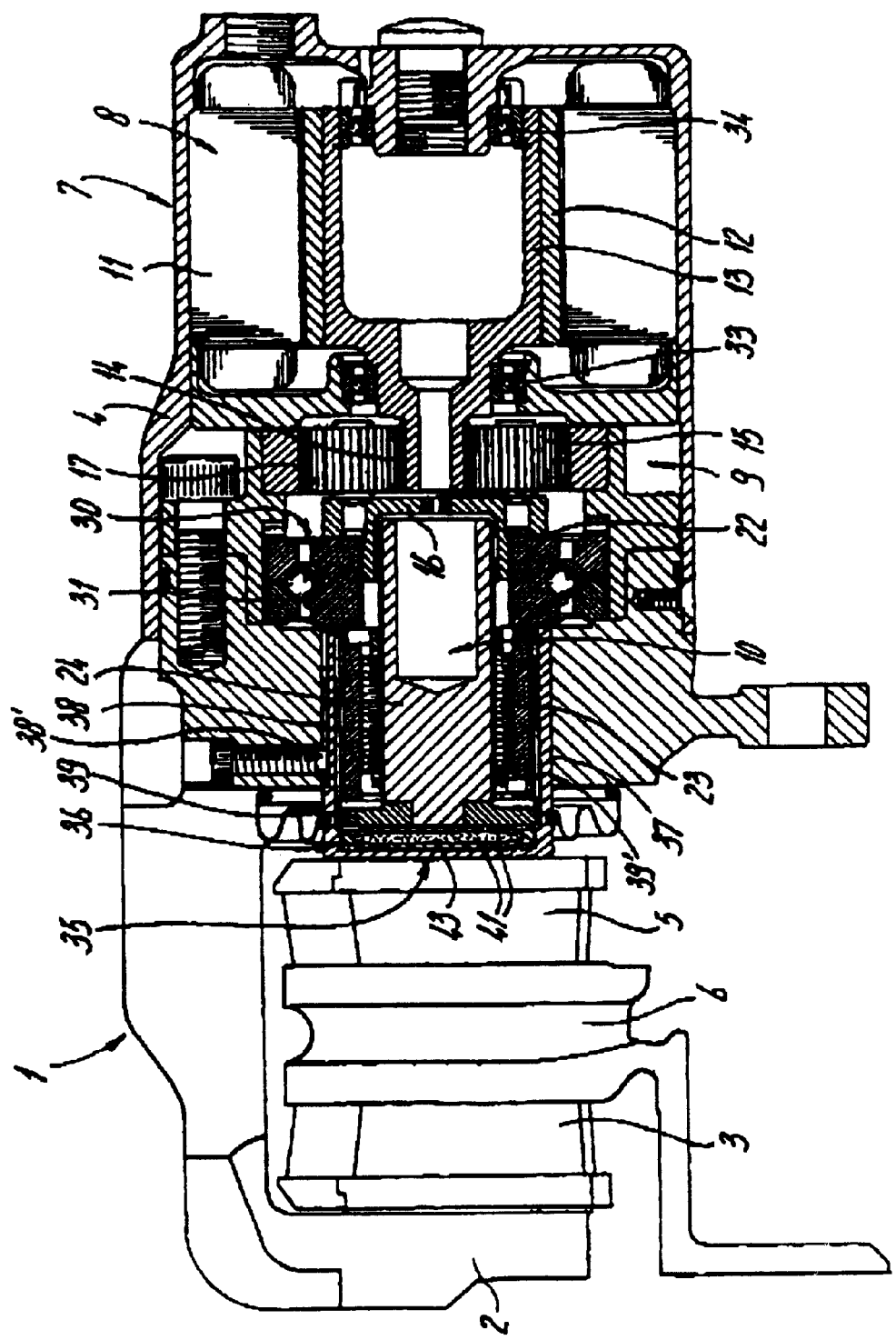

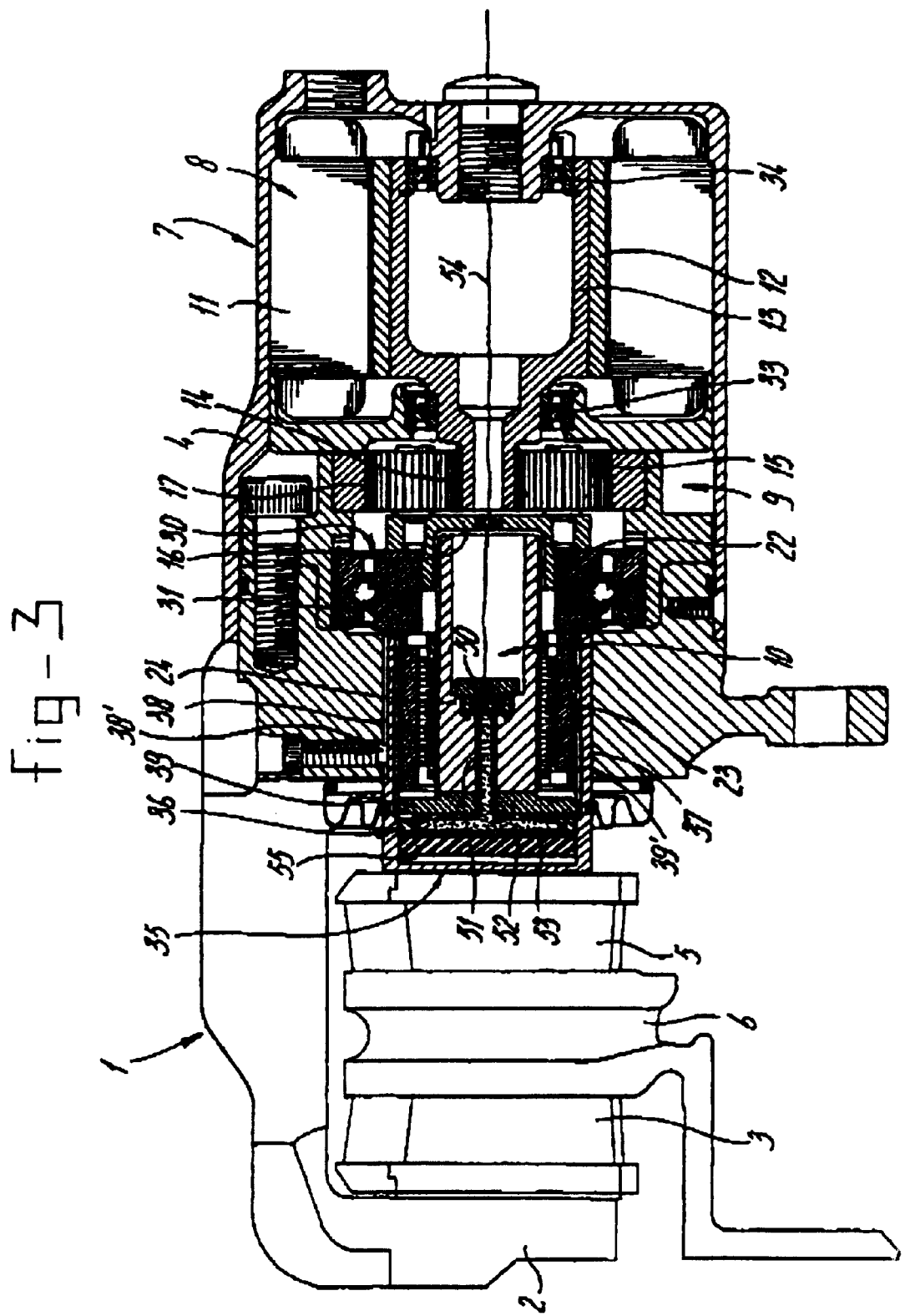

ACTUATOR COMPRISING FLEXIBLE ELEMENT, AND BRAKE CALLIPER COMPRISING SUCH ACTUATOR

BACKGROUND OF THE INVENTION

1. Field of Invention

The invention is related to an actuator comprising a housing, a motor, an actuating member and a screw mechanism providing a linear movement of the actuating member with respect to the housing in response to a rotational movement of the motor, said screw mechanism comprising a screw and a nut one of which is rotatably supported with respect to the housing.

2. Description of Related Art

Such actuator is known from WO-A-9603301. The actuator comprises a screw mechanism, consisting of a screw and a nut which engage each other by means of rollers having circumferential grooves. Such actuator provides a well defined axial displacement, and also a certain degree of reduction. Thus, a fairly, small axial displacement is obtained in response to a considerable rotation of the screw. Consequently, the screw may exert a considerable axial force on the actuating member.

The proper operation of the screw mechanism can be assured as long as the screw, nut and rollers are subject to a well-defined, axial load. In such case, all components are loaded in accordance with their design requirements; moreover, the load may then reach a considerable level without causing damage to the screw mechanism.

A very unfavorable case however occurs when the screw mechanism is subjected to loadings having a transverse or radial component. The screw, nut and rollers are not designed to accommodate the transverse load components, and will be damaged.

The same occurs in case the actuator is loaded by a bending couple, which is always associated with such transverse forces.

SUMMARY OF THE INVENTION

The object of the invention is to provide an actuator as described before, in which the problems related to transverse or radial loadings are circumvented or at least alleviated. This object is achieved in that the screw mechanism and the actuating member engage each other through a resilient intermediate pressure means. The resilient intermediate pressure means is able to transfer the required actuating force from the screw mechanism onto the actuating member. Thus, its stiffness in axial direction should be rather high. In particular, the stiffness should be maintained at a level where the required force/displacement relationship still provides the possibility to obtain the desired actuating force.

On the other hand, said resilient intermediate pressure means is not as stiff as a direct connection between the screw mechanism and the actuating member. This adapted stiffness has the advantage that extreme loadings, which have a certain transverse component or bending moment, are not directly and fully transmitted towards the screw mechanism. The resilient aspect of the force transmission between the screw mechanism and actuating member makes these transverse or bending loadings less severe or even absent.

According to a first possible embodiment of the invention, the screw mechanism and the actuating member engage each other through spring elements. The spring elements may provide an asymmetric stiffness distribution with respect to the axis of the screw mechanism. The asymmetric character of the spring elements may be obtained in several ways, e.g. by more or stiffer springs at one side of the axis of the actuating member and the screw mechanism than at the opposite side.

The advantage of an asymmetric layout of the spring elements is that it may anticipate an asymmetric loading pattern under full loading. An example of a non-aligned loading, which increases with the load level, is to be attributed to flexing of the claw piece in the application of an actuator in a disc brake.

According to a second possibility, the screw mechanism and the actuating member engage each other by means of a resilient pressure pad.

Such pressure pad may have a relatively small thickness compared to its lateral dimensions. It can therefore easily be accommodated between the actuating member and the screw mechanism, within narrow space constraints.

The pressure pad preferably comprises two generally parallel wall members, said wall members being mutually connected along their circumference and enclosing a closed internal space.

The actuating member may be carried out as a piston, said piston being accommodated in a cylinder which forms a bore in the housing of the screw mechanism. Thus, the intermediate resilient pressure member is supported against the inside of the piston head.

According to a further development, the resilient intermediate pressure means engages a load measuring device. In particular, the load measuring device senses the pressure of the fluid.

The pressure developed in the fluid provides a reliable measure of the force exerted by the actuator. Possible a non-axial or excentric loadings will not hamper the measurement of the overall axial loads to which the actuator is exposed. Thus, a reliable measurement is obtained.

If convenient, the internal space of the pressure pad is connected to a measuring channel, the free end of said channel being provided with the load measuring device. Thereby, the actual measurement, e.g., by a piezoelectric sensor, may be carried out a particular location which is for instance shielded from the area where the actuating member is located (heat, moisture).

The invention is also related to a brake caliper comprising a housing, a motor, an actuating member and a screw mechanism providing a linear movement of the actuating member with respect to the housing in response to a rotational movement of the motor, said screw mechanism comprising a screw and a nut, one of which is rotatably supported with respect to the housing. The screw mechanism and the actuating member engage each other through a resilient intermediate pressure means for pressing the brake pads onto the brake disc.

The resilient intermediate pressure means of the brake caliper may engage a load measuring device as well. The internal space of the pressure pad is connected to a measuring channel, the free end of said channel being provided with the load measuring device.

The actual load measuring device (e.g. a piezoelectric sensor) may now be situated at a location where the influence of the heat developed by the friction between the brake pads and the brake disc, is reduced.

The measuring channel may extend through the screw of the screw mechanism, the load measuring device being situated at the end of the screw which is opposite the pressure means. Furthermore, the load measuring device comprises a load cell or load sensor, the electric signal line thereof extending through thee internal space of the motor towards a connector or the like on the housing.

Preferably the fluid is a temperature resistant thermal oil.

BRIEF DESCRIPTION OF THE DRAWINGS

The invention will be explained further with reference to the embodiments shown in the figures.

FIG. 1 shows a first embodiment of a brake caliper comprising an actuator according to the invention.

FIG. 1a is an enlarge view of the actuating member illustrated in FIG. 1, having springs.

FIG. 2 shows a second embodiment.

FIG. 2a is an enlarged view of an actuating member illustrated in FIG. 2, having a pressure pad.

FIG. 3 shows a third embodiment.

DETAILED DESCRIPTION OF PREFERRED EMBODIMENTS

The brake caliper shown in FIG. 1 comprises a claw piece 1, having a flange 2 supporting brake pad 3, and a housing 4 carrying brake pad 5. Between the brake pads 3 and 5, a brake disc 6 is accommodated.

Brake pad 5 is moveable towards, and away from, the other brake pad 3 by means of an actuator 7 which comprises an electric motor 8, a reduction gear mechanism 9, and a screw mechanism 10. The motor 8 has a stator 11 and a rotor 12, which rotor 12 is connected to a tubular connecting member 13 carrying a sun gear wheel 14. The sun gear wheel 14 engages satellite gear wheels 15, which are accommodated on carrier 16. The satellite gear wheels 15 also engage the fixed ring gear wheel 17. The carrier 16, in particular shaft 18 thereof, engages the screw mechanism 10 by means of tubular intermediate 19. The tubular intermediate member 19 is supported rotatably within the tubular connecting member 13 by means of bearings 20, 21. The tubular intermediate member 19 is connected to nut 22 of the screw mechanism 10 which by means of rollers 23 engages screw 24. Screw 24 is held non-rotatably, but can move in an axial direction. The nut 22 forms a unity with the inner ring of the four point contact ball bearing 30, the outer ring 31 of which is supported in the housing 4.

The screw 24 engages the actuating member 25, in such a way that by means of the screw mechanism 10 the brake pad 5 can be moved towards, and away from, the other brake pad 3.

During a braking action, the brake pads 3, 5, may exhibit some play transverse with respect to the axis of screw mechanism 10. Thereby, the screw mechanism 10, in particular screw 24 thereof, may be loaded in a non-axial or non-aligned way.

In order to counteract the effects of such non-axial loadings, the surfaces 26 and 27 of the actuating members respectively the screw 24 engage each other by means of relatively stiff springs 28 and relatively flexible springs 29, whereby a locally different stiffness is obtained.

The stiffness ratio of these springs is selected in such a way that they simulate a flexing which is opposite to the flexing of the brake caliper, which flexing occurs as a result of the clamping forces by means of which the brake pads engage the brake disc. Thus, the caliper flexing is reversed or counteracted in order to obtain an axial load on the screw mechanism.

FIG. 1a is an enlarged view of the actuating member 25 as illustrated in FIG. 1, connected to the screw 24 by springs 28 and 29. As discussed previously, the springs 28 and 29 counteract the effects of non-axial loading that would be transmitted to the screw 24 in their absence.

The embodiment according to FIG. 2 corresponds to some extent to the embodiment of FIG. 1. The connecting member 13, which carries sun gear wheel 14, is now supported with respect to the housing by means of bearings 33, 34.

Furthermore, the carrier 16, which carries satellite gear wheels 15 which engage both the sun gear wheel 14 and the ring gear wheel 17, is connected to the nut 22 of the screw mechanism 10. This nut 22 at the same time constitutes the inner ring of the four point-ball bearing 30, the outer ring 31 of which is supported in the housing 4.

Nut 22 engages screw 24 by means of rollers 23. The screw is held against rotation, but is able to move in an axial direction. Thus, upon rotation of the nut 22, the screw 24 moves backward and forward, thus moving the brake pads 3, 5 onto each other and onto the brake discs 6, or moving them away from each other.

The actuating member is carried out as piston 35, which slidably held within the cylinder space 37 in the housing 4. By means of a groove nut connection 38, 38', the piston 35 is held non-rotatably, but slidably.

By means of further groove/nut connection 39, 39', screw 24 is also held non-rotatably, but slidably, with respect to piston 35.

The screw engages piston head 40 by means of the interposed pressure pad 36. This pressure pad 36 has two parallel walls 41, connected at the circumference 42, e.g. by means of welding. The internal space enclosed between the parallel walls 41 is filled with a pressure medium 43, e.g. a hydraulic fluid.

In case, as a result of the braking action, the brake pad 5 would tilt somewhat, and thereby causes somewhat misalignment between the axis of the piston 35 and the screw 24, pressure pad 36 may accommodate this misalignment. In this way, the screw 24 is still mainly loaded in axial direction, thus allowing a proper function of the screw mechanism 10.

FIG. 2a is an enlarged view of the actuating member or piston 35 as illustrated in FIG. 2, having a pressure pad 36. As discussed previously, the pressure pad 36 may accommodate misalignment between the axis of the piston 35 and the screw 24.

In the third embodiment, shown in FIG. 3, a load measuring device 50 has been applied. This may for instance be a piezoelectric sensor. The load measuring device 50 is connected to a measuring channel 51, which is connected to the internal space 52 of the pressure pad 53.

Through a signal cable 54, the load measuring device 50 is connected to a control unit for further processing of the data thus obtained. As shown in the figure, the signal table 54 is guided through the internal hollow space of the electric motor 7.

The internal space 52 and the measuring channel 51 may be filled with a thermal oil which is resistant to the high temperatures which may develop as a result of the friction between the brake pad 5 and the brake disc 6. Furthermore, a ceramic pad 55 may be arranged between the pressure pad 53 and the head of the piston 35, so as to thermally insulate the thermal oil as a further precaution.

What is claimed is:

1. Actuator, comprises a housing, a motor, an actuating member and a screw mechanism providing linear movement of the actuating member with respect to the housing in response to a rotational movement of the motor, said screw mechanism comprising a screw and a nut one of which is rotatably supported with respect to the housing, characterized in that the screw mechanism and the actuating member engage each other through a resilient pressure pad comprising two generally parallel wall members, said wall members being mutually connected along their circumference and enclosing a closed internal space which is filled with a fluid.

2. Actuator according to claim 1, wherein the actuating member is carried out as a piston, said piston being accommodated in a cylinder which forms a part of the housing of the screw mechanism.

3. Actuator according to claim 2, wherein the resilient pressure pad is supported against the inside of the piston head.

4. A brake caliper for a disc brake, comprising the actuator of claim 1, a claw piece carrying two opposite brake pads between which a brake disc can be accommodated, the housing of the actuator being connected to the claw piece and the actuating member being connected to one of the brake pads.

5. An actuator comprising a housing, a motor, an actuating member and a screw mechanism providing a linear movement of the actuating member with respect to the housing in response to a rotational movement of the motor, said screw mechanism comprising a screw and a nut, one of which is rotatably supported with respect to the housing, characterized in that the screw mechanism and the actuating member engage each other through a resilient pressure pad comprising two generally parallel wall members, said wall members being mutually connected along their circumference and forming a space which is filled with a fluid.

6. Actuator according to claim 5, wherein the resilient pressure pad engages a load measuring device.

7. Actuator according to claim 6, wherein the load measuring device senses the pressure of the fluid.

8. Actuator according to claim 7, wherein the internal space of the pressure pad is connected to a measuring channel, the free end of said channel being provided with the load measuring device.

9. Actuator according to claim 6, wherein the load measuring device comprises a piezoelectric sensor.

10. A brake calliper for a disc brake, comprising the actuator of claim 5, a claw piece carrying two opposite brake pads between which a brake disc can be accommodated, the housing of the actuator being connected to the claw piece and the actuating member being connected to one of the brake pads.

11. Brake calliper according to claim 10, wherein the resilient intermediate pressure means engages a load measuring device.

12. Brake calliper according to claim 11, wherein the load measuring device senses the pressure of the fluid.

13. Brake calliper according to claim 12, wherein the internal space of the pressure pad is connected to a measuring channel, the free end of said channel being provided with the load measuring device.

14. Brake calliper according to claim 13, wherein the measuring channel extends through the screw of the screw mechanism, the load measuring device being situated at the end of the screw which opposite the pressure means.

15. Brake calliper according to claim 14, wherein the load measuring device comprises a load cell or load sensor, the electric signal line thereof extending through the internal space of the motor towards a connector or the like on the housing.

16. Brake calliper according to claim 13, wherein the fluid is a high-temperature resistant thermal oil.

* * * * *